(12) United States Patent
Patel et al.

(10) Patent No.: US 12,093,228 B2
(45) Date of Patent: Sep. 17, 2024

(54) UPLOADING AND VALIDATION OF COMBINED OILFIELD DATA

(71) Applicant: Schlumberger Technology Corporation, Sugar Land, TX (US)

(72) Inventors: Swapnil Patel, Pune (IN); Jyoti Giri, Pune (IN); Abhinaav Singh, New Delhi (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 780 days.

(21) Appl. No.: 17/309,103

(22) PCT Filed: Oct. 29, 2019

(86) PCT No.: PCT/US2019/058456
§ 371 (c)(1),
(2) Date: Apr. 23, 2021

(87) PCT Pub. No.: WO2020/092300
PCT Pub. Date: May 7, 2020

(65) Prior Publication Data
US 2022/0003102 A1     Jan. 6, 2022

Related U.S. Application Data

(60) Provisional application No. 62/751,988, filed on Oct. 29, 2018.

(51) Int. Cl.
*G06F 16/00* (2019.01)
*E21B 43/12* (2006.01)
(Continued)

(52) U.S. Cl.
CPC ............ *G06F 16/215* (2019.01); *E21B 43/12* (2013.01); *E21B 43/30* (2013.01); *E21B 47/12* (2013.01); *G06F 16/26* (2019.01)

(58) Field of Classification Search
CPC ....... G06F 16/215; G06F 16/26; G01V 11/00; E21B 43/12; E21B 43/30; E21B 47/12
See application file for complete search history.

(56) References Cited

U.S. PATENT DOCUMENTS

2006/0052985 A1*  3/2006  Ito .......................... G01D 9/005
                                                          702/188
2007/0010947 A1*  1/2007  Ireland .................... G01V 1/40
                                                          702/6
(Continued)

FOREIGN PATENT DOCUMENTS

WO     2010027786 A1    3/2010

OTHER PUBLICATIONS

Preliminary Report on Patentability emailed on May 14, 2021 for the equivalent Patent Application PCT/US2019/058456.
(Continued)

*Primary Examiner* — Diedra McQuitery
(74) *Attorney, Agent, or Firm* — Jeffrey D. Frantz (57) ABSTRACT

A method for uploading, validating, and visualizing data in an oilfield software platform includes obtaining oilfield data at least partially collected using one or more sensors at a wellsite, deployed into a well, or both. The oilfield data comprises a plurality of data files, the plurality of data files being of different types. The method also includes loading the plurality of data files into a landing area, and validating the oilfield data contained in the plurality of data files. Validating includes examining dependencies between at least two different types of data, and visualizing lineages between different entities represented by the plurality of data files.

20 Claims, 5 Drawing Sheets

(51) Int. Cl.
*E21B 43/30* (2006.01)
*E21B 47/12* (2012.01)
*G06F 16/215* (2019.01)
*G06F 16/26* (2019.01)

(56) References Cited

U.S. PATENT DOCUMENTS

| | | |
|---|---|---|
| 2008/0276221 A1 | 11/2008 | Lev et al. |
| 2009/0063230 A1* | 3/2009 | Broussard ........ G06Q 10/06313 |
| | | 707/999.005 |
| 2010/0050017 A1* | 2/2010 | Almadi .................. E21B 47/12 |
| | | 713/400 |
| 2013/0274964 A1 | 10/2013 | Jesse et al. |
| 2015/0003688 A1 | 1/2015 | Kumar et al. |
| 2016/0326846 A1 | 11/2016 | Rashid et al. |

OTHER PUBLICATIONS

International Search report and the Written Opinion mailed on Feb. 21, 2020 for the equivalent Patent Application PCT/US2019/058456.

* cited by examiner

UPLOADING AND VALIDATION OF COMBINED OILFIELD DATA

CROSS-REFERENCE TO RELATED APPLICATIONS

This application is the National Stage Entry of International Application No. PCT/US2019/058456, filed Oct. 29, 2019, which claims priority to U.S. Provisional Patent Application having Ser. No. 62/751,988, which was filed on Oct. 29, 2018 and is incorporated by reference herein in its entirety.

BACKGROUND

Exploration and production data management solutions may store various types of industry-acquired data such as seismic data, wells headers, and production data. For loading data, the data management solutions may provide various loaders that allow users to load data in a landing area (e.g., a temporary repository used to hold the data before merging it to the data management solution). Once the data is available in the landing area, data validators can perform quality checks on it, correct it, and decide if it should be merged to the data management solution repository or if it should be rejected. If the user has to load and quality check multiple types of entities such as wells, boreholes, production data, and cores and marker, the data would be loaded in multiple landing areas. However, the current system supports loading of one data file in one landing area at a time.

This one-to-one relationship between landing areas and data files results in low-complexity, facilitating the analysis of the uploaded data for quality control. However, such a scheme also results in several inefficiencies to the data loaders, data validators, information technology (IT) teams, and data managers. For example, each data file is loaded in a separate landing area. Thus, the data loader and validator are unable to examine links and dependencies between the data in the different data files. Further, the number of landing areas for a client or project is variable, and since each occupies disk space in memory, allocating memory can be challenging. For instance, if the user desires to load one hundred files in parallel, the same number of landing areas are created. After the data loading is complete, the landing areas may persist but remain idle, consuming disk space.

SUMMARY

Embodiments of the disclosure may provide a method that includes obtaining oilfield data at least partially collected using one or more sensors at a wellsite, deployed into a well, or both. The oilfield data comprises a plurality of data files, the plurality of data files being of different types. The method also includes loading the plurality of data files into a landing area, and validating the oilfield data contained in the plurality of data files. Validating includes examining dependencies between at least two different types of data, and visualizing lineages between different entities represented by the plurality of data files.

Embodiments of the disclosure may also provide a non-transitory, computer-readable medium storing instructions that, when executed by at least one processor of a computing system, cause the computing system to perform operations. The operations include obtaining oilfield data at least partially collected using one or more sensors at a wellsite, deployed into a well, or both. The oilfield data comprises a plurality of data files, the plurality of data files being of different types. The operations include loading the plurality of data files into a landing area, and validating the oilfield data contained in the plurality of data files. Validating includes examining dependencies between at least two different types of data, and visualizing lineages between different entities represented by the plurality of data files.

Embodiments of the disclosure may further provide a computing system including one or more processors, and a memory system including one or more non-transitory, computer-readable media storing instructions that, when executed by at least one of the one or more processors, cause the computing system to perform operations. The operations include obtaining oilfield data at least partially collected using one or more sensors at a wellsite, deployed into a well, or both. The oilfield data comprises a plurality of data files, the plurality of data files being of different types. The operations include loading the plurality of data files into a landing area, and validating the oilfield data contained in the plurality of data files. Validating includes examining dependencies between at least two different types of data, and visualizing lineages between different entities represented by the plurality of data files.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
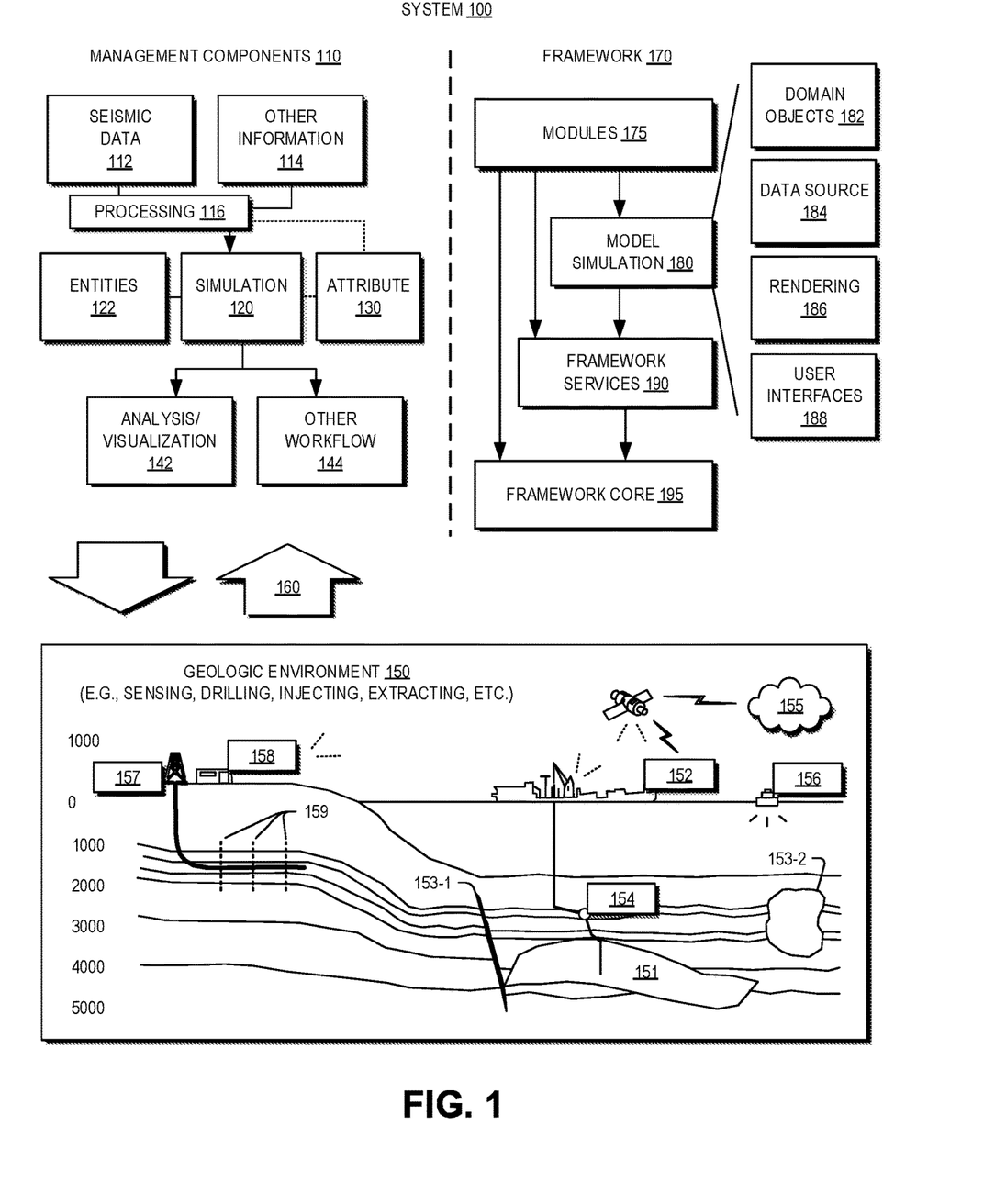
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

The systems and methods disclosed herein provide a loading process, which is part of a larger, a two-step loading of data into a database of a data management application, such as SEABED® (Schlumberger Limited, Houston, Texas). Using the loading process, the user can visualize the lineage between different entity types that are being loaded in landing areas and perform quality checks and correction. This process of loading provides a holistic view of the data that is being loaded in the data management solution. In some embodiments, the loading process permits the data files to be loaded in a single landing area, which allows users to avoid/omit creating multiple landing areas. Fewer landing areas may lead to less maintenance activities, saving on logistics and time and resources at client locations.

The systems and methods disclosed herein include the ability to load the data of multiple entity types present in various files, in one landing area. This allows data validators to quality check (QC) data on the dataset level instead of a file-by-file basis. Once the different entity data is loaded in a single landing area, quality checks can be executed automatically. The pre-defined QC rules may be applied to the holistic form of data. Thus, it is able to find various violations in the same. The user can also run the custom QC rules on the landing area, to find anomalies in the data. Once the violations are found, a data corrector can modify/tend to the violations.

The systems and methods disclosed herein allow the data validators to validate multiple entities and their relationships together in a single landing area, instead of performing validation checks of entities present in a single file. The data loaders may load the entities present in multiple files simultaneously onto a single landing area. For instance, data in multiple entities collected on a single day of well operation can be loaded together in a single landing area and be viewed in a holistic manner. This may provide benefits in terms of effort and time as these inconsistencies are unlikely to be missed and, thus, the merging to data management solutions may complete successfully.

Figure 2:
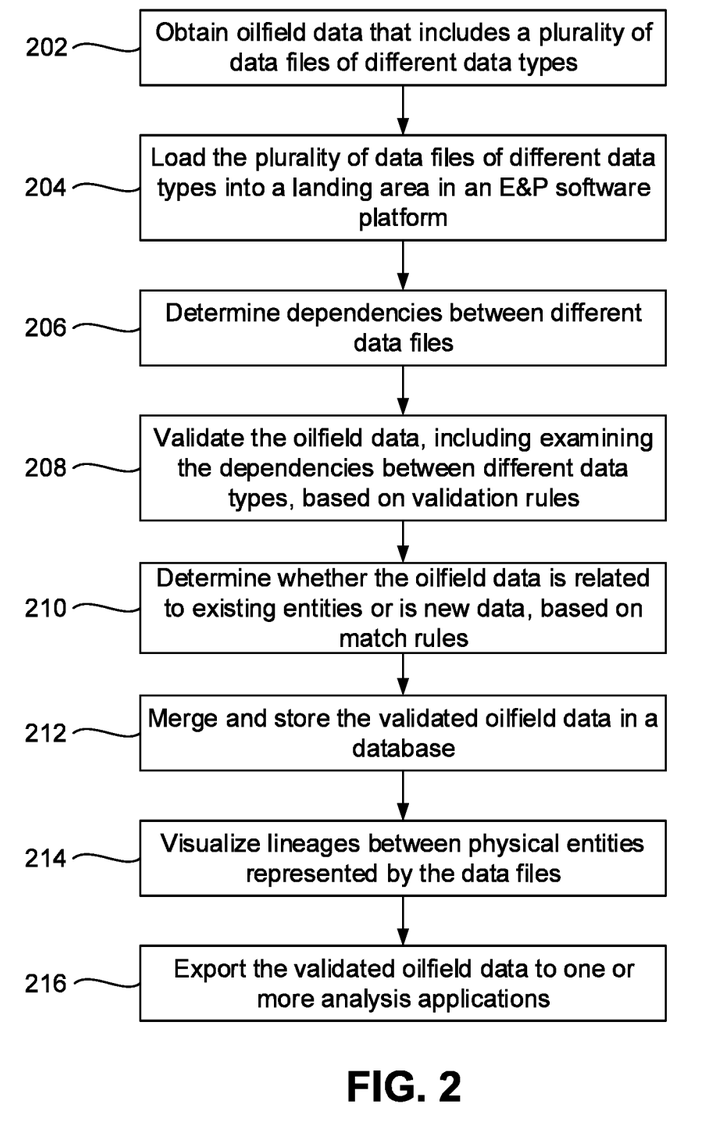
FIG. 2 illustrates a flowchart of a method for loading data into an E&P platform, according to an embodiment.

FIG. 2 illustrates a flowchart of a method 200 for loading and validating data in an oilfield software platform, according to an embodiment. In an embodiment, the method 200 may commence by obtaining oilfield data that includes a plurality of data files of different data types, as at 202. The data may be collected using one or more sensors located at a wellsite and/or within a well. Various types of pressure, logging, seismic, and/or other sensors may be used.

The different data files may each include a single type of data, e.g., for multiple entities. For example, one data file may contain data for a plurality of wells (the wells being an example of oilfield entities), and another may contain data for well logs for boreholes (boreholes being another example of oilfield entities), which may or may not be in the same well. That is, the borehole may have several well logs associated therewith, each of which may be part of the same data file. The well may have several boreholes, and each of these boreholes may have several well logs, resulting in a lineage between the well, the one or more boreholes associated therewith, and the one or more well logs associated with each of the well logs. It will be appreciated that this hierarchy/lineage may be replayed similarly for the different types of data discussed above, and/or others.

The method 200 may then include loading the plurality of data files of the different data types into a landing area in an exploration and production (E&P) software platform, as at 204. One example of such a software platform may be SEABED®; however, other embodiments may employ other oilfield software platforms. The software platform may be specifically tailored to receive the uploaded oilfield data as part of one or more data files, e.g., mud logs, drilling logs, well logs, seismic logs, etc. Before storing this data in a project file, the data may be quality checked, e.g., to detect and remove anomalous, duplicative, or otherwise faulty data.

In order to do so, the software platform may provide the aforementioned "landing area." The landing area may serve as a quarantine or sandbox for initial analysis of the data, prior to adding it to a project. The landing area may be provisioned disk space provided for this purpose, which may be accessible to one or more human domain experts, artificial intelligence, or any other human or machine element configured to analyze the data for quality assurance.

As noted above, the different data files, each representing different types of data (borehole data, well data) related to the different physical entities (e.g., wells, boreholes, etc.), may have lineages or hierarchical links therebetween. These lineages may result in dependencies between the data in the different files. These dependencies may provide insight into whether the data in the individual data files is valid. For example, data in one file may set limits on acceptable data in another data file of a different type, as will be described in greater detail below.

Figure 3:
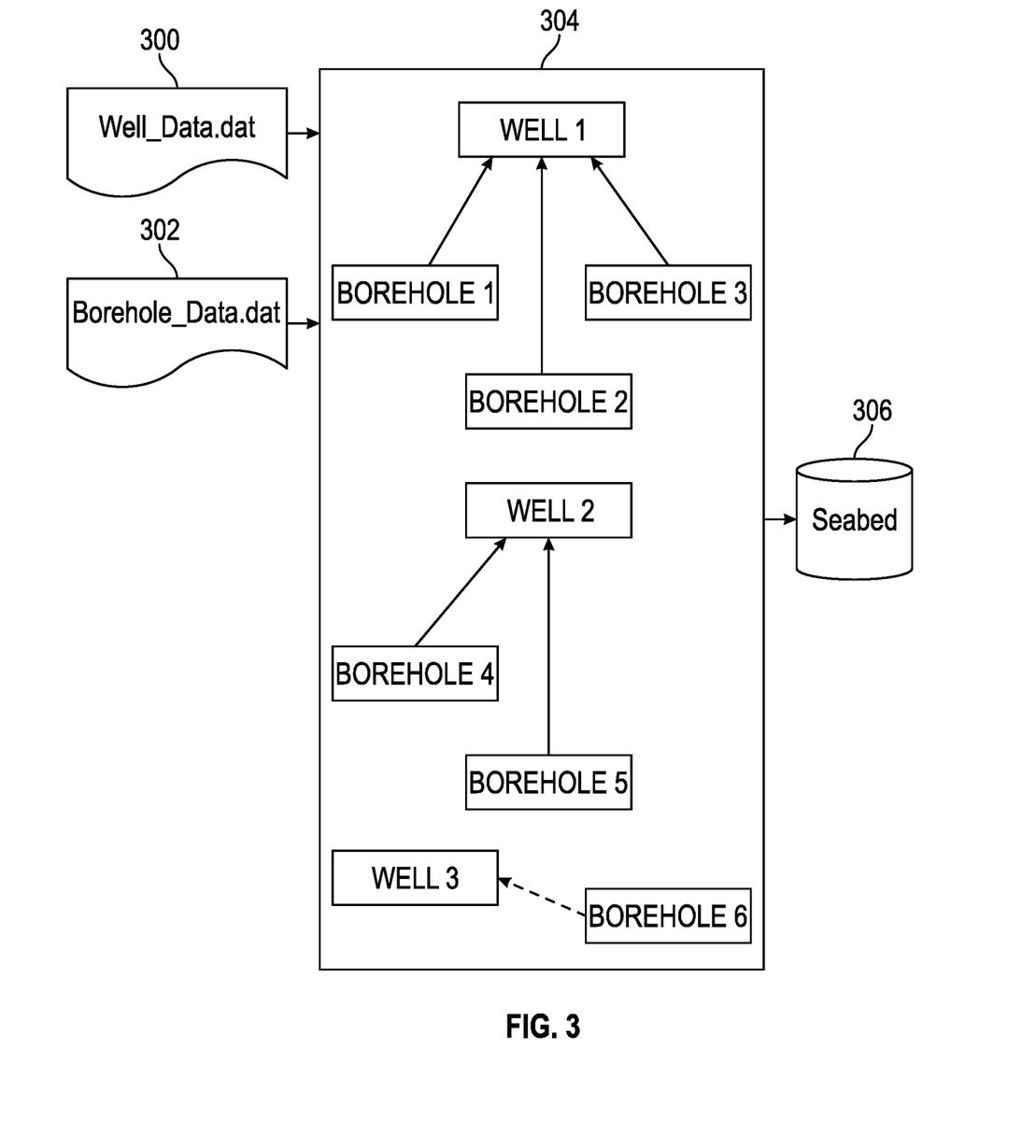
FIG. 3 illustrates a schematic view that shows the loading process using a single landing area for loading two different file types and analyzing data representing several different entities, according to an embodiment.

Accordingly, the method 200 may include determining such dependencies between the different data files, as at 206. The dependencies may be determined, for example, by extracting the dependency data from the data file related to the relevant entity. In order to better understand dependencies in general, FIG. 3 illustrates an example visualization of two data files 300, 302 that have been loaded into a single landing area 304. Upon quality checking the data for the different files 300, 302, e.g., as associated with different entities, the data may be loaded into a database 306.

The first data file 300 represents well data, and the second data file 302 represents borehole data. In particular, the well data file 300 includes well data for two wells: Well 1 and Well 2. Further, the well data file 300 may contain dependency data, e.g., identifying boreholes associated with the respective wells (an example of dependency data). For example, boreholes 1-5 may be associated with the wells 1 and 2, as shown. The borehole data file 302 includes data for six boreholes: borehole1, borehole2, Borehole 3, Borehole 4, Borehole 5, and Borehole 6.

As can be seen in FIG. 3, Borehole 6, in this example, is associated with Well 3, which was not represented in the well data file 300. In conventional systems, the well data file 300 would be uploaded in a separate landing area from the borehole data file 302. Thus, in such conventional systems, the data for Borehole 6 would be unable to be validated, as the project file (in the database 306) would have no indication of a third well, and no way to find the correct well to which the Borehole 6 data should be linked. Having a single landing area may avoid such a circumstance, as will be explained in greater detail below.

The dependency data may be stored in a data field for either or both of the wells and/or borehole entities; that is, the wells may specify the boreholes associated therewith and/or the boreholes may specify the wells with which they are associated. In either such case, the well information and borehole information is linked together in the landing area.

Referring again to FIG. 2, the method 200 may then proceed to validating the oilfield data, including examining the dependencies between different data types, based on predetermined validation rules, as at 208. Various different types of quality control checks may be used to perform this validation. These quality control checks may include any one or more of the following:

| Data Type | QC Workflow Example |
| --- | --- |
| Lease Data | Check the latitude and longitude values of the Lease data. Flags as erroneous data if the values are outside of geographical boundary |
| Well Current Status | Checks if the current status of a particular well. Flags as erroneous data if it is null or if not null then if it is older than 5 years. Skips wells with status as Abandoned. |
| Well Top Loc Check | Check the latitude and longitude values of the Well Top location data. Flags as erroneous data if the values are either null or outside of geographical boundary |
| Borehole Base Loc Check | Check the latitude and longitude values of the Borehole Base location data. Flags as erroneous data if the values are either null or outside of a geographical boundary. |
| Borehole Current Status | Checks if the current status of a particular borehole. Flags as erroneous data if it is null or if not null then if it is older than 5 years. Skips boreholes with status as Abandoned. |

| Data Type | QC Workflow Example |
| --- | --- |
| Compare Index and Logger Total Depth (TD) | Any well log acquired in a wellbore cannot have Index greater than the Logger TD. Flags as erroneous data all the channels with Index > Logger TD. |
| Logger Measured Depth (MD) and Driller MD | Well logging cannot go deeper than the actual depth of the borehole. Flags as erroneous data any boreholes with Logger TD > Driller TD. |

Returning to the example of FIG. 3, using a single landing area 304 for multiple different data files allows correcting the lineage of Borehole 6. Since the landing area has the information related not only to the boreholes, but also the wells, the data validator can find the correct well for Borehole 6. For example, in this case, the correct well for Borehole 6 may be Well 2 (which may be indicated by the data for Well 2). Thus, the validator can change the dependency data for Borehole 6, correctly linking it to Well 2. Once the data is corrected, the data validator can again run the QC workflows.

Thus, dependencies between the boreholes that are associated with the same well may be recognized as part of such examination. This allows pre-defined QC workflows to be applied more efficiently, as they can be used to find anomalies between different types of data loaded. This allows the validator to find QC violations in holistic way. As a result, in the event of any data anomalies between inter-dependent data available in different files, they are detected and reported. This gives the data corrector an opportunity to fix the violations related to inter-dependent data in the landing area.

The method 200 may also determine whether the uploaded oilfield data is related to (e.g., an update to or duplicative of) existing entities, or is new data, based on match rules, as at 210. Simultaneously, or after, the uploaded oilfield data may be merged with existing data and stored in the database 306, as at 212. For example, during the data-loading process new data items may be distinguished from existing data items, e.g., by timestamp or otherwise comparing the data with previously-uploaded data. Once distinguished, new and existing items may be treated differently. New items may be inserted, and existing data may be used to update entity data.

The process of determining if an item already exists is known as "matching," and employs merge or "match" rules. One merge rule may be UPSERT, where a match causes the data item to be updated and no match causes the data item to be inserted. Match rules are defined at the entity type level (for example, Well has a match rule distinct from Borehole), and these rules may be stored in a library for access by the validator.

In general, match rules include a combination of local attributes and references to other entities. As part of the logical data model, natural keys automatically become match rules for that entity type. A database manager may allow an authorized user to add, edit, and delete match rules to meet their specific matching rules.

The merge process of block 212 may be divided into several, e.g., four, stages. First, the data may be filtered in the landing area, where duplicative data in the landing area is removed. Next, a set of match rules may be applied. The match rules are a pre-defined set of rules that are used to identify matches between data in the landing area and existing data in the data management solution. Based on the identified matches, the merge process may include deciding if the data already exists in the data management solution or if the data is newly acquired data. If the data exists, it is updated with new values, else new data is inserted.

Performing the process for many landing areas (e.g., n landing areas) may involve repeating the above mentioned stages n number of times. Thus, the overall time to load the data in the data management solution project is the number of stages multiplied by n (where n is the number of data files (and also the number of landing areas) to be loaded in the data management solution). In this example, the time complexity would thus be 4n. However, if the same workflow is to be executed using the combined loading process, as described herein, the process can be performed using a single landing area (n=1), and the time complexity may be simply the time called for to proceed through one merge process.

Figure 4:
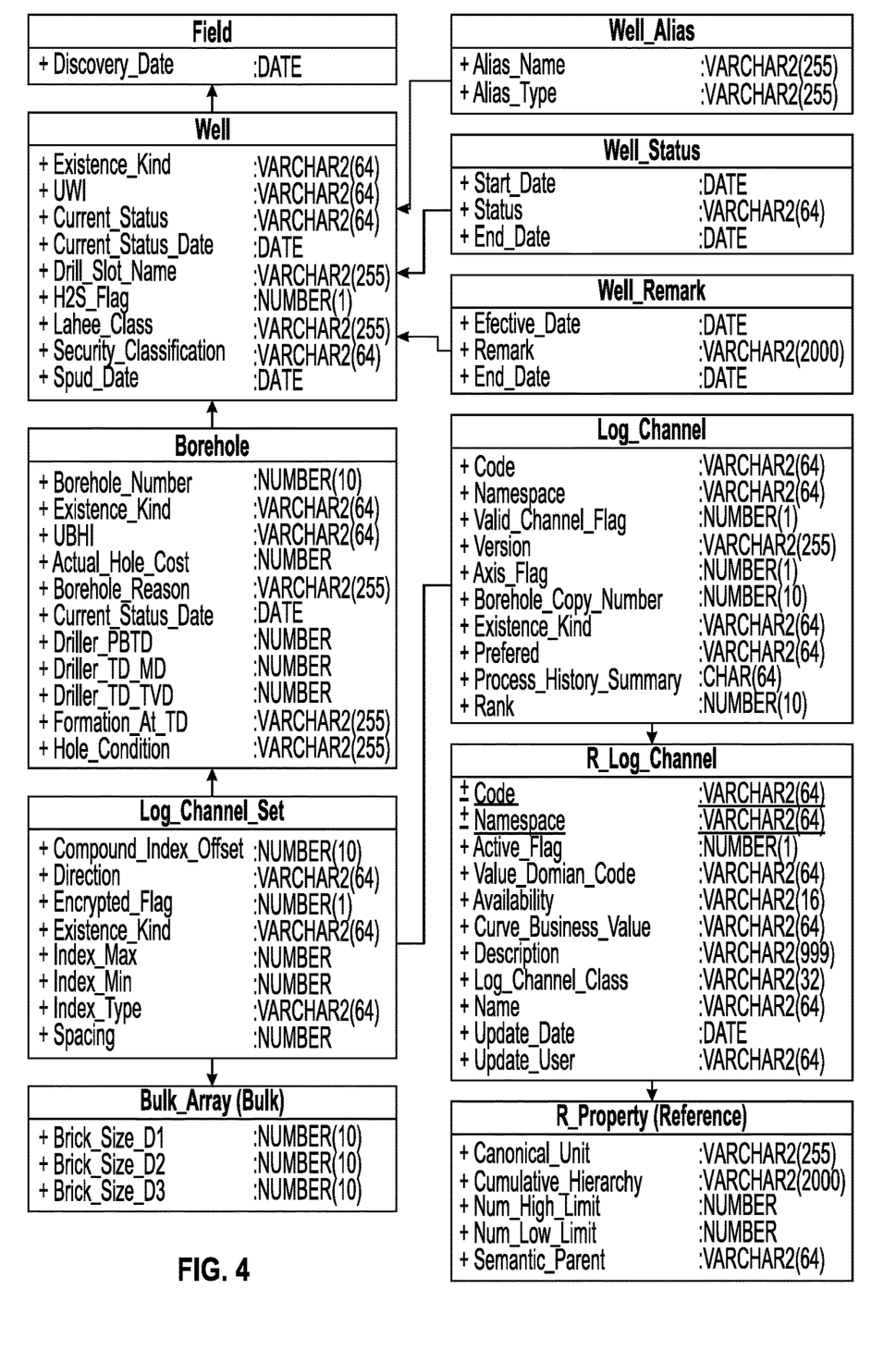
FIG. 4 illustrates a visualization of data types and entities for display, according to an embodiment.

The method 200 may also visualize the lineages between physical entities represented in the data file, as at 214. For example, a display, similar to that shown in FIG. 3, may be displayed on a computer screen, which may facilitate a user understanding and organizing the data uploaded. FIG. 4 illustrates a schematic view of a more-detailed view of such a visualization. As shown, boxes represent different entities. Further, data related to the entities branches off from the entities in a hierarchical fashion. As will be appreciated one well instance may have one or more borehole instance, and one borehole instance may have several data sets. This visualization at the data uploading stage, of the data that is in the landing area, may enable a user to quickly see dependency errors, e.g., if entities are not linked to higher-level entities, or otherwise not illustrated within the system as would be expected.

Once the quality control process establishes that no violations exist, the validated oilfield data may be merged and stored in the database 306, as at 212. The validated data may be accessible to the data upload platform (SEABED®).

Further, the upload platform may be configured to format the data and export it to other platforms, as at 216, for analysis of the data as part of a project. This may include geological modeling software, seismic processing/modeling software, and others.

The systems and methods disclosed herein provide efficient QC validations and merging processes. In addition, application of the new loading process controls the number of landing areas, as the user can choose to load multiple files in common landing areas. Thus, the new data loading process solve scalability issues in the number of landing areas that should be present to load multiple files.

Moreover, embodiments of the present disclosure may provide a data loading process that enhances maintenance of landing areas. The maintenance of landing areas involves some of given stages such as:

Freeing landing areas: This activity vacates the landing area and returns it to the pool of landing areas, thus creating availability for new data loading.

Creating landing areas: Creation of landing areas consumes time and space. It is a database intrinsic activity. Thus, database resources are also consumed while creating on landing areas. As multiple files can now be loaded in one landing area, fewer landing areas may be used. As a result, creation of new landing areas may sometimes be avoided.

Deletion of landing areas: When a user consumes a new major version of the data loading process, the administrative team may delete the existing landing areas. With the other loading process, users may have many landing areas that should be deleted before employing a new version of the data management solution, and they may be recreated once the deployment is complete.

In some embodiments, a result of implementing the method 200 is fewer landing areas, resulting in less deletion and recreation of the same. The activities involved in loading data in the landing area are reduced, because the data is loaded into the same landing area. The implementation may not add complexity for the user as the workflow remains the same from the end-user's perspective.

The process of loading the complete dataset to the landing area, and then further merging into the data management solution can be completely automated. QC rules can be generated using machine learning that can ensure the dataset is appropriately corrected without any manual intervention, and then subsequently merged into the data management solution.

Figure 5:
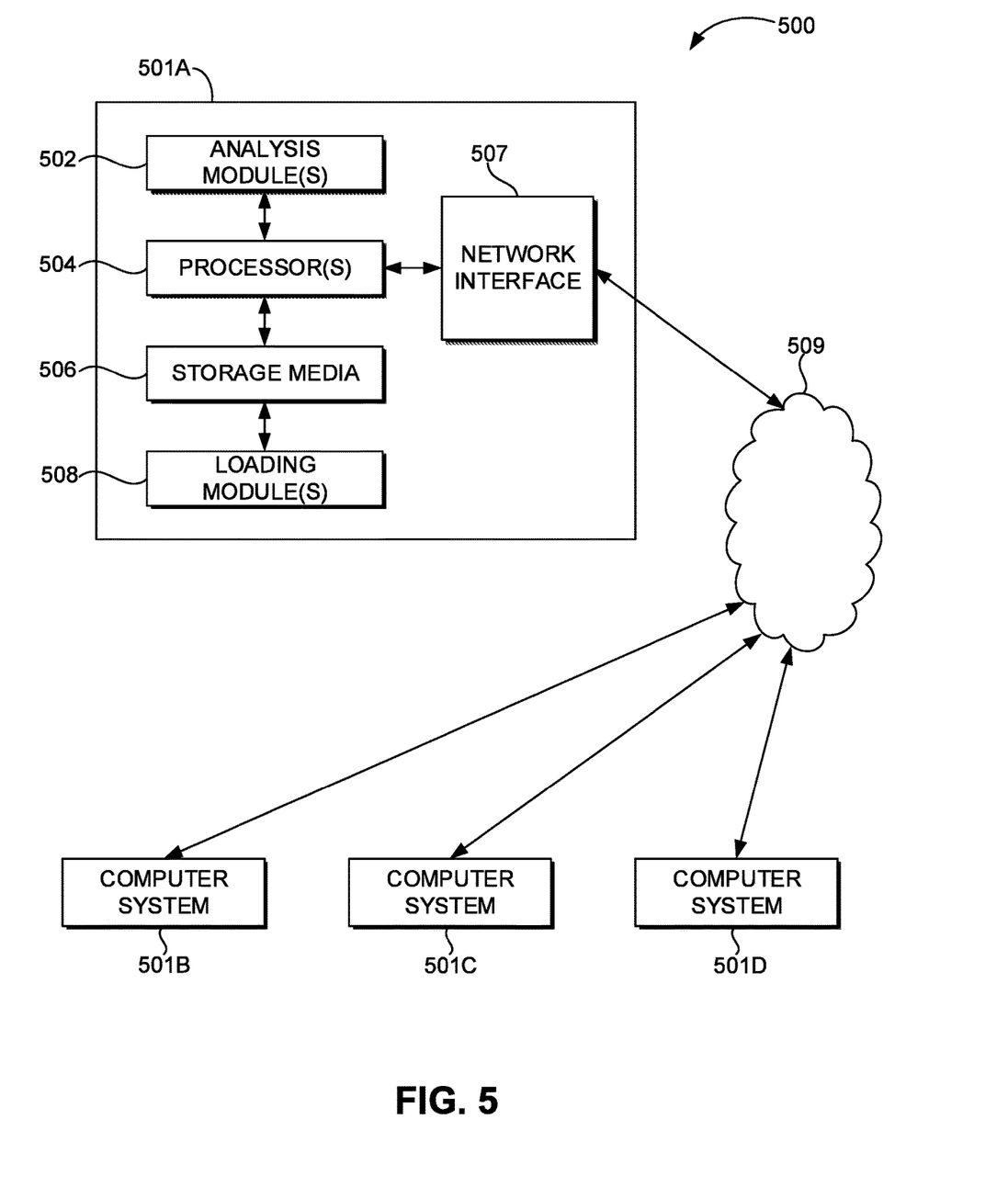
FIG. 5 illustrates a computing system for performing at least a portion of the method(s) disclosed herein, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more validation and decision-making module(s) 508. In the example of computing system 500, computer system 501A includes the validation and decision-making module 508. In some embodiments, a single validation and decision-making module may be used to perform some aspects of one or more embodiments of the methods disclosed herein. In other embodiments, a plurality of validation and decision-making modules may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
   obtaining oilfield data at least partially collected using one or more sensors at a wellsite, deployed into a well, or both, wherein the oilfield data comprises a plurality of data files, the plurality of data files being of different types;
   loading the plurality of data files into a landing area;
   validating the oilfield data contained in the plurality of data files, wherein validating comprises examining dependencies between at least two different types of data; and
   visualizing lineages between different entities represented by the plurality of data files.

2. The method of claim 1, wherein the plurality of data files comprise a first file including data representing one or more first oilfield entities, and a second file comprising data representing a plurality of second oilfield entities, wherein two or more of the second oilfield entities are linked with one of the one or more first oilfield entities.

3. The method of claim 2, wherein the one or more first oilfield entities comprise oilfield wells, and wherein the second oilfield entities comprise boreholes.

4. The method of claim 1, further comprising merging the oilfield data, after validating the oilfield data, with previously-uploaded data in a database based on match rules.

5. The method of claim 4, further comprising exporting the oilfield data from the database into an analysis application.

6. The method of claim 1, wherein the landing area comprises a single landing area, and wherein the data files are not loaded into another landing area.

7. The method of claim 1, wherein validating the data comprises determining that no or an acceptable number of anomalies are present in the oilfield data.

8. A non-transitory, computer-readable medium storing instructions that, when executed by at least one processor of a computing system, cause the computing system to perform operations, the operations comprising:
   obtaining oilfield data at least partially collected using one or more sensors at a wellsite, deployed into a well, or both, wherein the oilfield data comprises a plurality of data files, the plurality of data files being of different types;
   loading the plurality of data files into a landing area;
   validating the oilfield data contained in the plurality of data files, wherein validating comprises examining dependencies between at least two different types of data; and
   visualizing lineages between different entities represented by the plurality of data files.

9. The non-transitory, computer-readable medium of claim 8, wherein the plurality of data files comprise a first file including data representing one or more first oilfield entities, and a second file comprising data representing a plurality of second oilfield entities, wherein two or more of the second oilfield entities are linked with one of the one or more first oilfield entities.

10. The non-transitory, computer-readable medium of claim 9, wherein the one or more first oilfield entities comprise oilfield wells, and wherein the second oilfield entities comprise boreholes.

11. The non-transitory, computer-readable medium of claim 8, wherein the operations further comprise merging the oilfield data, after validating the oilfield data, with previously-uploaded data in a database based on match rules.

12. The non-transitory, computer-readable medium of claim 11, wherein the operations further comprise exporting the oilfield data from the database into an analysis application.

13. The non-transitory, computer-readable medium of claim 8, wherein the landing area comprises a single landing area, and wherein the data files are not loaded into another landing area.

14. The non-transitory, computer-readable medium of claim 8, wherein validating the data comprises determining that no or an acceptable number of anomalies are present in the oilfield data.

15. A computing system, comprising:
   one or more processors; and
   a memory system comprising one or more non-transitory, computer-readable media storing instructions that, when executed by at least one of the one or more processors, cause the computing system to perform operations, the operations comprising:
      obtaining oilfield data at least partially collected using one or more sensors at a wellsite, deployed into a well, or both, wherein the oilfield data comprises a plurality of data files, the plurality of data files being of different types;
      loading the plurality of data files into a landing area;
      validating the oilfield data contained in the plurality of data files, wherein validating comprises examining dependencies between at least two different types of data; and
      visualizing lineages between different entities represented by the plurality of data files.

16. The system of claim 15, wherein the plurality of data files comprise a first file including data representing one or more first oilfield entities, and a second file comprising data representing a plurality of second oilfield entities, wherein two or more of the second oilfield entities are linked with one of the one or more first oilfield entities.

17. The system of claim 16, wherein the one or more first oilfield entities comprise oilfield wells, and wherein the second oilfield entities comprise boreholes.

18. The system of claim 15, wherein the operations further comprise merging the oilfield data, after validating the oilfield data, with previously-uploaded data in a database based on match rules.

19. The system of claim 18, wherein the operations further comprise exporting the oilfield data from the database into an analysis application.

20. The system of claim 15, wherein the landing area comprises a single landing area, and wherein the data files are not loaded into another landing area.

* * * * *